(12) United States Patent
Robbin

(10) Patent No.: US 10,781,048 B2
(45) Date of Patent: Sep. 22, 2020

(54) METHOD FOR OPERATING A CONVEYOR SYSTEM

(71) Applicant: EISENMANN SE, Böblingen (DE)

(72) Inventor: Jörg Robbin, Ammerbuch (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 16/329,286

(22) PCT Filed: Aug. 28, 2017

(86) PCT No.: PCT/EP2017/071565
§ 371 (c)(1),
(2) Date: Feb. 28, 2019

(87) PCT Pub. No.: WO2018/041786
PCT Pub. Date: Mar. 8, 2018

(65) Prior Publication Data
US 2019/0248587 A1    Aug. 15, 2019

(30) Foreign Application Priority Data
Sep. 1, 2016 (DE) .......................... 10 2016 116 362

(51) Int. Cl.
| | |
|---|---|
| B65G 43/00 | (2006.01) |
| B65G 17/12 | (2006.01) |
| B65G 35/06 | (2006.01) |
| B62D 65/18 | (2006.01) |

(52) U.S. Cl.
CPC ............ *B65G 17/12* (2013.01); *B62D 65/18* (2013.01); *B65G 43/00* (2013.01)

(58) Field of Classification Search
None
See application file for complete search history.

(56) References Cited

U.S. PATENT DOCUMENTS

| | | | |
|---|---|---|---|
| 5,211,115 A | 5/1993 | Maier et al. | |
| 5,682,820 A * | 11/1997 | Arata | ........................ B61L 27/04 104/88.04 |
| 7,487,869 B2 | 2/2009 | Swoboda | |
| 8,496,103 B2 * | 7/2013 | Federmann | ............ B65G 35/06 198/465.3 |
| 2003/0146069 A1 | 8/2003 | Kaiser | |
| 2003/0149509 A1 | 8/2003 | Udou et al. | |
| 2007/0272519 A1 | 11/2007 | Swoboda | |
| 2008/0035449 A1 | 2/2008 | Lee | |
| 2010/0074717 A1 | 3/2010 | Huang et al. | |
| 2010/0326832 A1 | 12/2010 | Albeck et al. | |
| 2013/0032448 A1 | 2/2013 | Huettner et al. | |

FOREIGN PATENT DOCUMENTS

| | | |
|---|---|---|
| DE | 10 42 380 | 1/1992 |
| DE | 10 2006 025 240 | 12/2007 |
| DE | 20 2007 009 334 | 11/2008 |
| DE | 10 2008 020 077 | 12/2009 |
| EP | 0 582 348 | 2/1994 |
| EP | 1 484 267 | 12/2004 |
| EP | 2 231 492 | 9/2010 |
| EP | 2 500 296 | 9/2012 |
| EP | 2 554 499 | 2/2013 |
| JP | 3183082 | 7/1996 |
| JP | 2007-200205 | 8/2007 |
| WO | 02/14133 | 2/2002 |

\* cited by examiner

*Primary Examiner* — Kavel Singh
(74) *Attorney, Agent, or Firm* — Schroeder Intellectual Property Law Group, LLC

(57) ABSTRACT

A method for operating a conveyor system for objects, in which a conveyor apparatus is present at an operating site and is operated with a plurality of conveyor carts each having at least one fastening device for at least one object. The number of conveyor carts available at the operating site for operating the conveyor apparatus for a process sequence defines an actual number; the number of conveyor carts needed at the operating site to operate the conveyor apparatus for the process sequence defines a target number. The difference between the actual number and the target number defines a required number if the actual number is less than the target number, or defines an excess number if the actual number is greater than the target number. A conveyor cart pool is provided and comprises a stock number of conveyor carts, at least some of which are stored at a pool site which differs from the operating site of the conveyor apparatus. A number of conveyor carts corresponding to the required number is physically transferred from the conveyor cart pool to the operating site, as a result of which the actual number is increased by the required number and the stock number is reduced by the required number, or a number of conveyor carts corresponding to the excess number is assigned to the conveyor cart pool, as a result of which the actual number is reduced by the excess number and the stock number is increased by the excess number.

10 Claims, No Drawings

METHOD FOR OPERATING A CONVEYOR SYSTEM

RELATED APPLICATIONS

This application is a national phase of International Patent Application No. PCT/EP2017/071565 filed Aug. 28, 2017, which claims priority to German Patent Application No. 10 2016 116 362.7 filed Sep. 1, 2016 the contents of both of which are incorporated herein by reference.

FIELD OF THE INVENTION

The invention relates to a method for operating a conveyor system for objects, in which a conveyor facility is present at an operating site, said conveyor facility being operated with a plurality of conveyor carts which each exhibit at least one fastening device for at least one object.

BACKGROUND OF THE INVENTION

In the following, the term "conveyor facility" always designates a conveyor facility for conveying objects. Such conveyor facilities for objects may take the form both of ground-based conveyor facilities, in which the conveyor carts may be rail-bound or free-running, or of suspended track systems in which the conveyor carts constitute a conveyor suspension attachment such as is known in and of itself. In this case, ground-level rails or rails for suspended track systems may be of single-track or dual-track design.

Conveyor facilities of such a type come into operation in all fields in which objects have to be conveyed. These fields include storehouses and warehouses for finished articles or products, as well as fabricating shops in which objects are conveyed that are processed and/or treated there. The latter case will be elucidated in the following on the basis of the example constituted by the automobile industry. However, the invention relates to all types of conveyor systems with conveyor facilities for objects.

In the automobile industry, conveyor facilities of such a type are employed, for instance, in a manufacturing plant for producing vehicles, in which vehicle bodies or the attachments thereof are conveyed to the operating site through several plant zones of a manufacturing plant for producing vehicles. In these cases, the objects are accordingly vehicle bodies or attachments of vehicle bodies, such as bumpers, wing-mirrors or the like. The respective fastening device of the conveyor carts may have been set up in such a way that it is able to receive the vehicle body directly, without the vehicle body having been fastened to an object-carrier such as, for instance, a skid which is known in and of itself. Alternatively, the fastening device of the conveyor carts may have been set up in such a way that it is able to receive such an object-carrier to which the vehicle body has then been fastened. If attachments are to be conveyed, the fastening device may have been conceived as an object-carrier or as a pannier for several such attachments.

Vehicle bodies especially, after they have been assembled in a body-in-white plant from individual parts and have been given protection against corrosion in an anticorrosion plant, in particular by virtue of a cataphoretic dip coating, are subjected, prior to reaching a final-assembly plant, to a surface treatment in a surface-treatment plant, which altogether comprises relatively many individual treatment steps and, as a rule, begins with the drying of the cataphoretic dip coating. In the body-in-white plant, work is consequently carried out on preliminary stages of the vehicle body, namely on the individual phases in the course of assembling the vehicle body, whereas, in the final-assembly plant, work is consequently carried out on subsequent stages of the vehicle body, namely on the individual phases in the course of the assembling of components and structural parts in and on the finished vehicle body. In the present case, both such preliminary stages of the vehicle body and such subsequent stages of the vehicle body are covered by the term "vehicle body". With respect to the body in white, the first sheet-metal part and all the intermediate bodywork structures up until the definitive vehicle body can accordingly already be understood as vehicle body.

Consequently a plant for producing vehicle bodies comprises various plant zones which have to be passed through by the vehicle bodies in a certain order, and in which work of varying type on the vehicle bodies is carried out. Such work includes both measures in which the vehicle body is influenced actively or said vehicle body are changed or supplemented—such as, for instance, in the course of the assembling of individual parts in the body in white or in the final assembly—in the course of an application of material or in the course of the drying of the vehicle bodies, and also measures in which no active influence on the vehicle body is undertaken, such as, for instance, an audit or a flashing-off of the vehicle body. In the surface-treatment plant the vehicle bodies are treated in varying ways in the varying plant zones within the scope of such work.

In all the working zones there are working facilities with which or in which the corresponding work is performed. In the surface-treatment plant such working facilities correspondingly take the form of treatment facilities.

In a body-in-white plant, varying ways of fastening body parts to one another, for example, are performed in various plant zones.

In the course of a cataphoretic dipping treatment for protection against corrosion in the anticorrosion plant, only one plant zone may be present. But, depending on techniques that are chosen for the purpose of applying a protection against corrosion and that are not a dipping treatment or not a sole dipping treatment, several zones may also be present.

The various plant zones in the surface-treatment plant can substantially be subdivided into application zones, temperature-control zones and functional zones, in which connection one or more treatment devices may have been arranged in the individual plant zones of the surface-treatment plant.

In the application zones the vehicle bodies are provided with a coating or with a material. For example, this includes the application of filler, basecoat or topcoat, or the application of material for underbody protection, or of material for seam sealing.

In the temperature-control zones the vehicle bodies are brought to a specified temperature-range. By "temperature control" of a vehicle body is meant the bringing about of a certain temperature of the vehicle body that the latter does not at first have. It may be a question of an increase in temperature or a decrease in temperature. The flashing-off of a vehicle body is also undertaken within the scope of a "temperature control".

In the functional zones, measures are undertaken that support the overall process and the overall sequence of operations. These include, for example, the implementations of audits and, where appropriate, the reworking of surface regions of the vehicle body that do not conform to the required quality standard. Another functional zone constitutes, for example, a storage zone in which vehicle bodies can be stored temporarily and/or held in reserve.

A final-assembly plant defines, as a rule, only a single plant zone. The installation measures and assembly measures therein are numbered amongst work of one type.

The aforementioned conveyor facility—that is to say, a conveyor facility operating in accordance with the same concept—may, where appropriate, be employed only in one plant zone or only in a few plant zones of the manufacturing plant if types of work and treatment differing from one another require differently conceived conveyor facilities. Such known different conveyor facilities which are used in various plant zones and/or working facilities or treatment facilities are, for instance—in addition to the aforementioned rail-bound or free-running conveyor facilities and suspended track systems—chain conveyors, roller tracks with or without transverse-displacement carts and turntables in which the vehicle bodies may likewise have been fastened—at least for a time—to aforementioned skids.

In a different approach, there is provision that the vehicle bodies are conveyed through the plant zones of the surface-treatment plant with one and the same conveyor facility, at least from an anticorrosion treatment as far as a final assembly in a surface-treatment plant for the surface treatment of the vehicle bodies.

Nowadays there is a demand that the manufacturing plants or conveyor plants flexibly adapted to altered process sequences or delivery routines or are able to react flexibly to changing operating circumstances. In the case of fabrication plants this includes, for example, the possibility that the conveyor facility can be varied in its routing, so that existing plant zones can be passed through by the objects in different orders in the course of various process sequences, or additional plant zones can be included in the process sequence, or existing plant zones can be excluded from the process sequence. In any case, it may happen that the number of conveyor carts necessary for the operation of the plant or of the conveyor facility changes. In particular, the possible total throughput of the manufacturing plant for producing vehicles, and in particular the total throughput of the surface-treatment plant pertaining to this plant, may increase or decrease.

An alteration of a process sequence may also consist only in the increase or decrease of the total throughput, without the order of the individual working steps being altered.

An alteration of the total throughput is reflected directly in the number of conveyor carts that have to be available for operating the conveyor facility for a process sequence.

Empirical values show that most plants nowadays are operated only at partial load during 60% of their operating-time. However, in order to take throughput peaks into account, the plants and the conveyor facilities thereof have been designed for maximum throughput. This means that a correspondingly high number of conveyor carts are held in reserve, which are then also stored at the operating site.

This leads, on the one hand, to high basic investment costs for conveyor carts that are not needed and that stand idle during a major part of the operating-time of the plant, and, on the other hand, to a particular expense in order to accommodate these conveyor carts held in reserve at the operating site and to keep them ready for operation.

SUMMARY OF THE INVENTION

Now it is an object of the invention to provide a method of the aforementioned type, by which these disadvantages are at least diminished.

This object is achieved in the case of a method of the aforementioned type, in that a) the number of conveyor carts available at the operating site for operating the conveyor facility for a process sequence defines an actual number; and
b) the number of conveyor carts required at the operating site for operating the conveyor facility for the process sequence defines a desired number; and
c) the difference between the actual number and the desired number defines a demand number if the actual number is less than the desired number, or defines a surplus number if the actual number is greater than the desired number; and
d) a conveyor-cart pool is provided which comprises a stock number of conveyor carts, at least some of which are stored at a pool site which is different from the operating site of the conveyor facility; and
f) a number of conveyor carts corresponding to the demand number are physically transferred from the conveyor-cart pool to the operating site, as a result of which the actual number increases by the demand number, and the stock number decreases by the demand number; or
g) a number of conveyor carts corresponding to the surplus number are assigned to the conveyor-cart pool, as a result of which the actual number decreases by the surplus number, and the stock number increases by the surplus number.

DETAILED DESCRIPTION OF THE INVENTION

In accordance with the invention it is consequently ascertained whether the number of conveyor carts available for a process sequence, namely the actual number, coincides with the number of conveyor carts needed for the process sequence, namely the desired number.

A demand for conveyor carts additionally required for the process sequence with respect to the existing conveyor carts, or a surplus of conveyor carts no longer needed for the process sequence, is adjusted via the conveyor-cart pool.

The conveyor facility includes a transfer device, by means of which conveyor carts can be removed from the conveyor facility or taken up into the conveyor facility. The outward transfer of surplus conveyor carts from a conveyor facility, or the inward transfer of additionally needed conveyor carts into a conveyor facility can be carried out manually by workmen or may occur semi-automatically or fully automatically.

In order that failures of conveyor carts that are caused by technical faults can be compensated quickly on site, both the actual number and the desired number may respectively define a larger number of conveyor carts than is actually required for the operation of the conveyor facility in the case of a predetermined process. By virtue of this, a few conveyor carts are always present at the operating site as a security buffer.

In the event of an alteration of the process sequence and/or an alteration of the total throughput of a conveyor facility, the desired number becomes either larger or smaller, whereas the actual number initially remains unchanged, since the number of conveyor carts available at the operating site does not change. If additional conveyor carts are then incorporated into the conveyor facility on demand, or surplus conveyor carts are separated out from the conveyor facility, the actual number changes accordingly and, after this, coincides again with the desired number.

If one or more conveyor carts have to be exchanged without a process sequence being altered, fewer conveyor carts, for instance, are available for the operation of the conveyor facility. This may be necessary, for instance, if individual conveyor carts have a technical fault or have to be serviced. In this case, the actual number decreases, whereas the desired number remains unchanged. If the conveyor carts to be exchanged are replaced from the conveyor-cart pool, the actual number increases again accordingly and, after the exchange of the conveyor carts, coincides again with the desired number.

The quota of conveyor carts of the conveyor-cart pool is stored and kept operational, at least in part, at a location other than the operating site, so that no corresponding measures have to be taken at the operating site of the conveyor facility for conveyor carts that, from time to time, are not needed.

Overall, the method according to the invention opens up the possibility of saving resources and investment costs, this becoming still clearer in the following.

The method becomes particularly effective if
a) the conveyor facility is a first conveyor facility, and the operating site thereof is a first operating site;
b) a second conveyor facility is present at a second operating site which is different from the first operating site, the second conveyor facility also being operated with a plurality of conveyor carts, and the conveyor carts of the first and of the second conveyor facility being at least compatible with one another;
c) for the first conveyor facility and the second conveyor facility an actual number, a desired number, a demand number, a surplus number and a demand number are ascertained separately in each instance.

Consequently conveyor carts for the first conveyor facility and/or for the second conveyor facility can be taken from the conveyor-cart pool or released from the first conveyor facility and/or from the second conveyor facility to the conveyor-cart pool or assigned to the conveyor-cart pool, in order to react to changes in the demand for conveyor carts at the operating sites.

The conveyor carts of the two conveyor facilities are preferably of identical construction. In principle, however, it is sufficient, as stated, if the conveyor carts are compatible with one another, so that all the conveyor carts are suitable for both conveyor facilities at the first and at the second operating site. In the case of rail-bound conveyor facilities, this means, as a rule, that at least the chassis units of the conveyor carts, the rail system and the transmission of energy and data have been designed and operate in accordance with the same basic concept. Where appropriate, minor differences in the style of construction of conveyor carts for conveyor facilities at various operating sites can be adapted in situ. In particular, this may relate, for example, to the fastening devices of the conveyor carts if differing objects are to be conveyed with various conveyor facilities at various operating sites. In this case, the unsuitable fastening devices of conveyor carts that come from the conveyor-cart pool are exchanged for suitable fastening devices at the operating site or already at the pool site.

If at least some of the conveyor carts of the conveyor-cart pool are stored at the first operating site and/or at the second operating site, conveyor carts that are not needed at one of the two operating sites can be taken directly to the other operating site if a higher demand in comparison with the existing conveyor carts arises there. In this case, it is accordingly possible to dispense with the need for conveyor carts to be firstly transported from the one operating site, in which a surplus number has arisen, to the pool site and then from there to the other operating site. If yet more conveyor carts are needed at the operating site with increased demand than can be transferred from the other operating site—that is to say, if the demand number at the one operating site is greater than the surplus number at the other operating site, further conveyor carts are accordingly delivered from the pool site.

The method becomes more effective if
a) a third conveyor facility is present at a third operating site, or yet more further conveyor facilities are present at respectively yet further operating sites, which in each instance are different from the first and the second operating site, the third or the yet more further conveyor facilities also being operated with a plurality of conveyor carts, and the conveyor carts of all the conveyor facilities being at least compatible with one another;
b) for the third or for each further conveyor facility an actual number, a desired number, a demand number, a surplus number and a demand number are ascertained separately in each instance.

In this case, conveyor carts for the existing conveyor facilities can be taken from the conveyor-cart pool on demand or can be released from the existing conveyor facilities to the conveyor-cart pool in the event of a surplus, in order to react to changes in the demand for conveyor carts at the operating sites.

If a conveyor-cart quota can be released from an operating site at which a surplus number has arisen, the spatial distance from various operating sites at which a demand exists for additional conveyor carts can also be ascertained and taken into consideration, in order to keep the transportation paths as short as possible.

With regard to the compatibility of the conveyor carts, that which was stated above applies correspondingly.

Preferentially, at least some of the conveyor carts of the conveyor-cart pool are then stored at one operating site, at several operating sites or at all operating sites, so that conveyor carts that are not needed at one operating site can likewise be transported directly to another operating site if a higher demand arises there in comparison with the existing conveyor carts.

Depending on the number of conveyor facilities pertaining to the conveyor system overall at various operating sites, and on the actual number prevailing there in each instance, the conveyor system comprises a total number of conveyor carts in the system that is equal to the sum of the actual numbers of individual existing conveyor facilities and the stock number of the conveyor-cart pool.

In the extreme case, the total number in the system corresponds to the number of conveyor carts that is necessary in order to operate all the existing conveyor facilities at the same time with a respectively maximum throughput, inclusive of the excess conveyor carts which have each been provided as a security buffer at the operating site, and, where appropriate, with the addition of a maintenance quota of conveyor carts, in order to balance out non-operational conveyor carts that are being subjected to maintenance or repair.

However, the conveyor system elucidated herein is also based upon the perception that such a large total number of conveyor carts in the system will, as a rule, not be necessary in order to operate the conveyor system with several conveyor facilities at various operating sites without deficits of conveyor carts occurring at one or more operating sites. Consequently, the total number of conveyor carts in the system can be kept less than the sum of the conveyor carts that would have to be held in reserve in the case of several conveyor facilities at various operating sites which have not been combined under one conveyor system. By virtue of this, the investment costs for each individual conveyor facility at its respective operating site can be lowered.

In the case of the elucidated method, the first conveyor facility or the first and the further conveyor facilities can be operated by one and the same operator, who also assumes responsibility for the management of the conveyor-cart pool and the transportation of the conveyor carts between the existing operating sites and the pool site.

The provision and coordination of the transportation-cart pool may, where appropriate, be undertaken by an independent or higher-ranking authority which is independent of the operator of the conveyor facilities.

Various conveyor facilities at different operating sites may also be operated by two or more different operators, in which case all the conveyor facilities have nevertheless been incorporated into the conveyor system and linked with the conveyor-cart pool.

The transportation of conveyor carts between operating sites and/or the pool site can be undertaken in the form of piece goods using established shipment concepts. In this case, use may be made of transportation aids. For instance, the conveyor carts, where appropriate in a shipping crate, can be loaded onto Euro pallets and transported by transportation means designed appropriately for this purpose. For this purpose, truck shipments by haulage contractors, for instance, also enter into consideration. Alternatively, use may be made of special shipping containers adapted to the conveyor carts, into which the conveyor carts drive and from which the conveyor carts can drive out again. In the case of rail-bound conveyor carts mentioned in the introduction, such a shipping container may, for instance, carry a corresponding length of rail with it, onto which one or more conveyor carts can drive.

So-called swap bodies may also be provided. A swap body is a special trailer for the transportation of several conveyor carts. Swap bodies of such a type can also be used advantageously for the reception of conveyor carts that have to be serviced and therefore have to be separated out from the actual number pertaining to a conveyor facility.

Taking into consideration the aforementioned security buffer with respect to the actual number of transportation carts at the operating site, an exchange of such transportation carts to be serviced may, for instance, be undertaken only when a certain number of pieces has been attained.

The conveyor system preferentially includes a central control device which receives or retrieves the actual number and the desired number for a certain conveyor facility at the operating site thereof and calculates therefrom the demand number or surplus number. Alternatively, a demand number or surplus number arising for a conveyor facility can also be communicated directly to the central control device. The central control device processes the data and, depending upon the situation, initiates the procedure that conveyor carts are transported to a conveyor facility and for this purpose are fetched from another conveyor facility or from the pool site, or that conveyor carts are fetched merely from one conveyor facility and transported to the pool site. Where appropriate, the central control device additionally receives from a conveyor facility in which a surplus of conveyor carts has arisen an item of information that the conveyor carts now to be assigned to the conveyor-cart pool may remain at the operating site. The control device calculates the distribution of conveyor carts between the individual operating sites and the pool site by algorithms that have been matched to the conveyor system, taking into consideration the data of all the operating sites and of the conveyor-cart pool.

The communication of the data to the central control device can be undertaken manually or automatically. In the latter case, a communication of the data to the central control device is to be undertaken automatically when a control facility which is present at the operating site of a conveyor facility in question registers an alteration of the actual number or of the desired number, from which an altered demand for conveyor carts results.

With regard to the conveyor facilities, the elucidated method can be utilized particularly effectively if use is made of one or more conveyor facilities, the conveyor carts of which are capable of being displaced on a rail system, in which case each conveyor cart includes a conveyor-cart chassis which has been coupled with the fastening device by means of a connecting device. In this case it is accordingly a question of rail-bound conveyor facilities that may have been conceived as ground-level track or suspended track. By virtue of the connecting device, an exchange of the fastening device can be undertaken in relatively straightforward manner if this is necessary.

It is favorable, in addition, if use is made of one or more conveyor facilities in which the conveyor-cart chassis of a conveyor cart includes a forerunner unit preceding in a conveying direction and a trailer unit succeeding in the conveying direction. If the forerunner unit and the trailer unit have been coupled in articulated manner, conveyor carts capable of taking curves can, for instance, be provided that take account of the present-day requirements as regards flexible routing options.

Particularly advantageously, use is made of one or more conveyor facilities, the conveyor carts of which each carry their own drive system, so that the conveyor carts are capable of being propelled and displaced independently of one another.

Preferentially in this case, use is made of one or more conveyor facilities in which the drive system of a conveyor cart includes at least one drive roller, which is supported by the conveyor-cart chassis and capable of rolling on a running surface of the rail system, and includes at least one drive motor for the at least one drive roller, which is carried along by the transportation-cart chassis. Conveyor carts of such a type can be readily separated out from a conveyor facility or integrated into a conveyor facility.

It is particularly favorable if use is made of one or more conveyor facilities in which at least one of the conveyor carts carries a self-sufficient energy-supply device, by means of which the at least one drive motor of the transportation cart is capable of being supplied with energy. In this case, no compatibility requirements have to be satisfied as regards the energy supply along the conveying path in the case of several conveyor facilities of the conveyor system, as would be the case, for instance, with contact lines known in and of themselves.

The conveyor carts that have been assigned to the conveyor-cart pool may have been accommodated in storage facilities. For this purpose, storehouses with or without rack concept enter into consideration, for instance. Alternatively, however, the storage facilities may have been designed to be analogous to the conveyor devices, so that the conveyor carts can be traversed in the storage facility, and no separate transportation units are necessary for a movement of the conveyor carts in the storage facility. At an operating site of a conveyor facility a storage facility may also have been formed, for instance by a buffer section of the conveyor facility, into which the conveyor carts can drive and from which the conveyor carts can drive out again.

What is claimed is:

1. A method for operating a conveyor system for objects, in which a conveyor facility is present at an operating site, comprising:
   operating a conveyor facility with a plurality of conveyor carts which each exhibit at least one fastening device for at least one object,
   wherein
   a) the number of conveyor carts available at the operating site for operating the conveyor facility for a process sequence defines an actual number; and
   b) the number of conveyor carts required at the operating site for operating the conveyor facility for the process sequence defines a desired number; and
   c) the difference between the actual number and the desired number defines a demand number if the actual number is less than the desired number, or defines a surplus number if the actual number is greater than the desired number; and
   d) a conveyor-cart pool is provided which comprises a stock number of conveyor carts, at least some of which are stored at a pool site which is different from the operating site of the conveyor facility; and
   f) a number of conveyor carts corresponding to the demand number are physically transferred from the conveyor-cart pool to the operating site, as a result of which the actual number increases by the demand number, and the stock number decreases by the demand number; or
   g) a number of conveyor carts corresponding to the surplus number are assigned to the conveyor-cart pool, as a result of which the actual number decreases by the surplus number, and the stock number increases by the surplus number.

2. The method as claimed in claim 1, wherein
   the conveyor facility is a first conveyor facility, and the operating site thereof is a first operating site and further comprising the steps of
   providing a second conveyor facility at a second operating site which is different from the first operating site, the second conveyor facility also being operated with a plurality of conveyor carts, and the conveyor carts of the first and of the second conveyor facility being at least compatible with one another; and
   ascertaining an actual number, a desired number, a demand number, and a surplus number of conveyor carts for the first conveyor facility and the second conveyor facility separately in each instance.

3. The method as claimed in claim 2, further comprising the step of storing at least some of the conveyor carts of the conveyor-cart pool at the first operating site and/or at the second operating site.

4. The method as claimed in claim 3, further comprising the steps of
   a) providing a third conveyor facility at a third operating site or yet more further conveyor facilities at respectively yet further operating sites, which in each instance are different from the first and the second operating site, the third or the yet more further conveyor facilities also being operated with a plurality of conveyor carts, and the conveyor carts of all the conveyor facilities being at least compatible with one another; and
   b) ascertaining an actual number, a desired number, a demand number, and a surplus number of conveyor carts for the third conveyor facility or for each further conveyor facility separately in each instance.

5. The method as claimed in claim 4, further comprising the step of storing at least some of the conveyor carts of the conveyor-cart pool at one operating site, at several operating sites or at all operating sites.

6. The method as claimed in claim 1, further comprising the step of providing each conveyor cart with a conveyor-cart chassis which is coupled with the fastening device by means of a connecting device where use the conveyor carts are used in one or more conveyor facilities and are displaced on a rail system.

7. The method as claimed in claim 6, further comprising the step of providing each conveyor-cart chassis of a conveyor cart with a forerunner unit preceding in a conveying direction and a trailer unit succeeding in the conveying direction.

8. The method as claimed in claim 7, further comprising the step of providing each conveyor cart with its own drive system, so that each conveyor cart is capable of being propelled and displaced independent of the other conveyor carts.

9. The method as claimed in claim 8, further comprising the step of providing the drive system of each conveyor cart with at least one drive roller, which is supported by the conveyor-cart chassis and capable of rolling on a propelling running surface of the rail system, and includes at least one drive motor for the at least one drive roller, which is carried along by the transportation-cart chassis.

10. The method as claimed in claim 9, further comprising the step of providing at least one of the conveyor carts with a self-sufficient energy-supply device, by means of which the at least one drive motor of the conveyor cart is capable of being supplied with energy.

* * * * *